United States Patent [19]

Vitaloni

[11] 4,247,173
[45] Jan. 27, 1981

[54] EXTERNAL REAR VIEW MIRROR FOR MOTOR VEHICLES

[75] Inventor: Alberto Vitaloni, Turin, Italy

[73] Assignee: Vitaloni S.p.A., Beinasco, Italy

[21] Appl. No.: 20,395

[22] Filed: Mar. 14, 1979

[30] Foreign Application Priority Data

Sep. 28, 1978 [IT] Italy .................. 53734 B/78[U]

[51] Int. Cl.³ .............................................. G02B 5/08
[52] U.S. Cl. .............................. 350/307; 248/475 B; 248/479
[58] Field of Search ................ 350/288, 307; 248/481, 248/484, 479, 485–487, 475 B

[56] References Cited

U.S. PATENT DOCUMENTS

| | | | |
|---|---|---|---|
| 2,565,012 | 8/1951 | Barrett | 248/486 X |
| 3,005,383 | 10/1961 | Pierson | 350/307 |
| 3,059,790 | 10/1962 | Augustus | 350/307 X |

FOREIGN PATENT DOCUMENTS

| | | | |
|---|---|---|---|
| 2726446 | 12/1978 | Fed. Rep. of Germany | 350/307 |
| 794962 | 5/1958 | United Kingdom | 350/307 |
| 998396 | 7/1965 | United Kingdom | 248/484 |

*Primary Examiner*—F. L. Evans
*Attorney, Agent, or Firm*—Sughrue, Rothwell, Mion, Zinn & Macpeak

[57] ABSTRACT

A rear view mirror which can be extended and retracted laterally in a vertical plane, with respect to the body of a commercial vehicle, by means of an arm structure comprising an expandable polygonal linkage which interconnects a mirror body with a rotatable part of an articulated support fixed to the vehicle; the linkage having pivots formed by bolts which can be tightened to lock the mirror in an adjusted setting.

8 Claims, 5 Drawing Figures

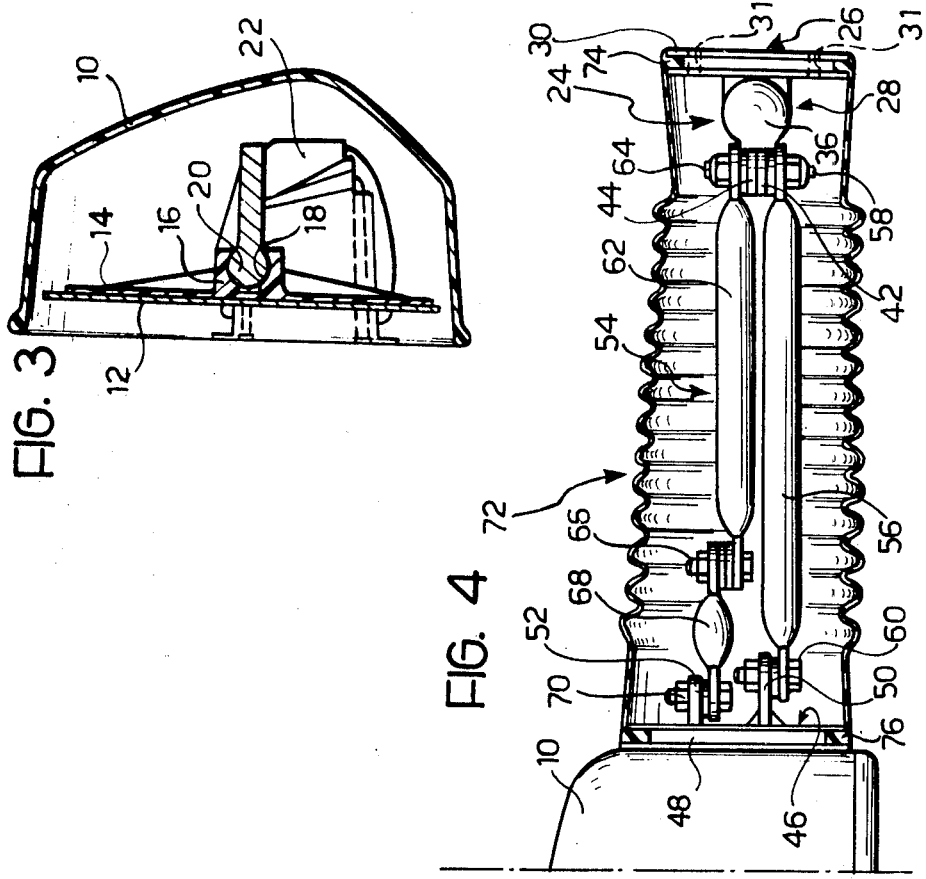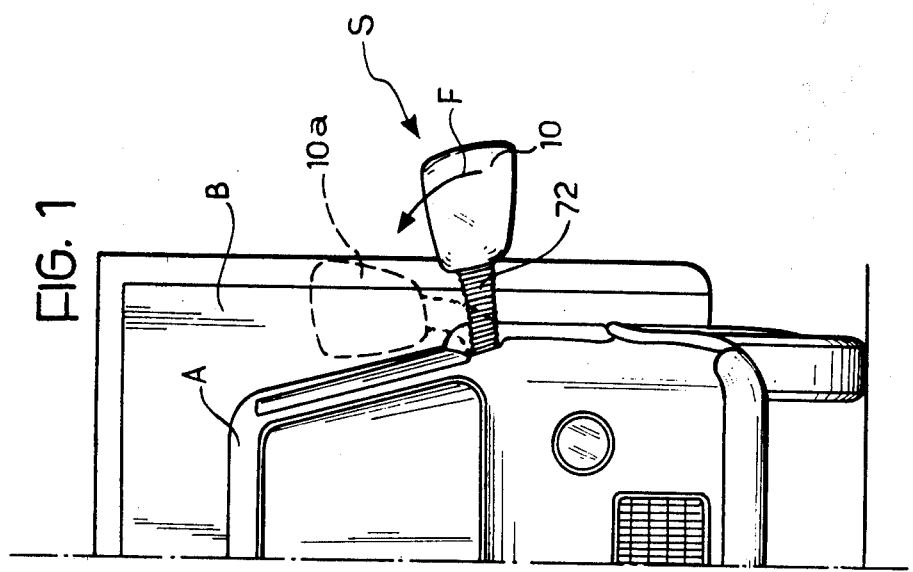

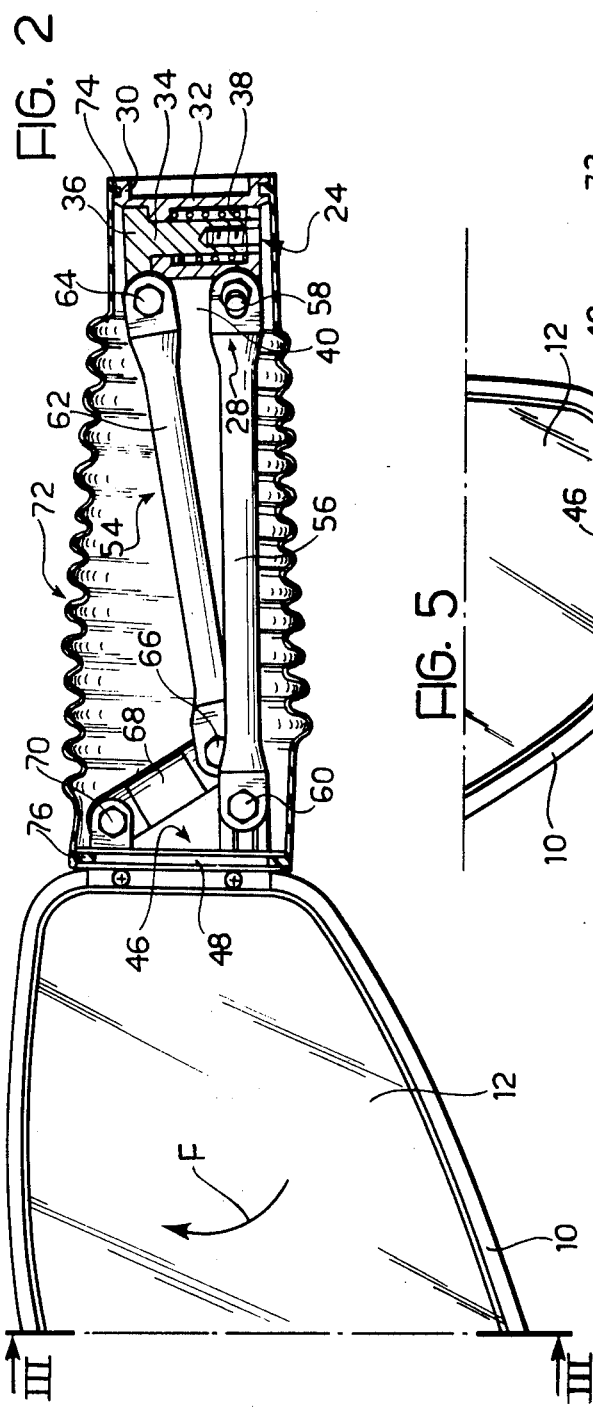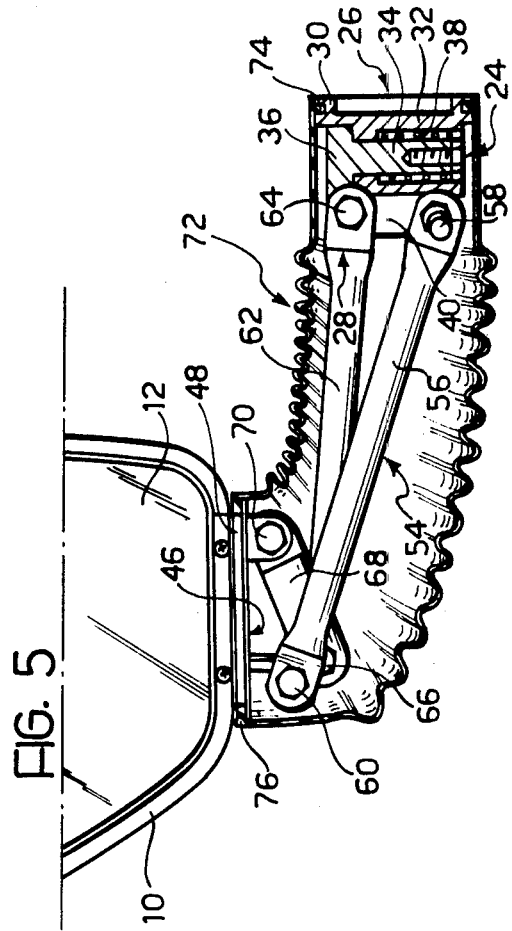

EXTERNAL REAR VIEW MIRROR FOR MOTOR VEHICLES

The present invention relates to external rearview mirrors for motor caravans, commercial vehicles and the like, particularly those in which that part of the vehicle body behind the driver's cab is wider than the cab.

More particularly, the invention is concerned with rear-view mirrors of the type comprising a mirror body by which a reflective element is adjustably supported, an articulated support having a fixed part adapted to be fixed to a side of a vehicle body, and a rotatable part, and an arm structure which interconnects the rotatable part of the support and a side of the mirror body to support the latter in a projecting manner with respect to the vehicle body; the rotatable part of the support being pivoted, with respect to the fixed part, about an axis which, in the mounted position of the mirror on the vehicle, is substantially vertical so as to enable an angular movement of the mirror body and the arm structure between a laterally extended position projecting laterally outwardly with respect to the vehicle body and a retracted position against the body.

The object of the present invention is to provide a rear-view mirror of the aforesaid type in which:

(1) the arm structure is of sufficient length to support the reflecting element in a projecting manner from the side of the driver's cab in such a way that the reflecting element projects beyond the widest part of the vehicle body behind the cab;

(2) the arm structure enables the adjustment of both the height and the lateral distance of the reflecting element with respect to the driver's cab;

(3) the arm structure enables the mirror body and the reflecting element to be drawn near to the cab, not only by means of the said angular movement around the vertical pivot axis of the articulated support, but also by means of a movement of the mirror body and the reflecting element in a substantially vertical plane, transversely with respect to the vehicle, which causes it to be retracted within the profile of the body behind the cab, thus, enabling the vehicle to have access to narrow passages.

According to the present invention there is provided a rear-view mirror of the aforesaid type in which the arm structure comprises a linkage having pivot axes which, in the mounted position on the vehicle, are substantially horizontal, said linkage forming a polygon which is expandable at least between an extended position, in which the mirror body is at a maximum distance from the support and a retracted position in which, in the mounted position on the vehicle, the mirror body is raised and drawn near the vehicle body, the linkage being provided with releasable locking means for selectively preventing and permitting the expansion of said linkage.

Thus, the mirror body with its reflecting element may be raised and lowered at will by means of the expandable linkage which can be locked in the desired position.

One embodiment of the invention will now be more particularly described, by way of example, with reference to the accompanying drawings, in which:

FIG. 1 is a frontal view of part of a motor vehicle provided with an external rear-view mirror according to the present invention;

FIG. 2 is a partially sectioned elevational view from the rear of the rear-view mirror in an extended position;

FIG. 3 is a cross section taken on the line III—III of FIG. 2;

FIG. 4 is a partially sectioned view from above, of the rear view mirror in the extended position, and FIG. 5 is a partially sectioned elevational view, similar to FIG. 2, showing the mirror in a retracted position.

FIG. 1 shows a motor vehicle, for example, a delivery van or motor caravan, having a driver's cab A and a body B of larger width than the cab A. The body B may comprise, for example, a box structure in the case of a delivery van, or an accommodation unit in the case of a motor caravan.

On one side of the bodywork of the cab A an external rear view mirror assembly, generally indicated S, is mounted. The mirror assembly S has a shell-like body 10, open on a rearwardly-facing side, made, for example, of plastics material or light alloy. the body 10 forms a mount for a reflective element 12 comprising a plane or slightly convex mirror.

As shown in FIG. 3, the reflective element 12 is fixed, for example, by means of adhesive, to a backing plate 14 which has in its centre a boss 16 formed internally with a spherical socket 18. A part-spherical ball or knee 20 is engaged in the socket 18 forming a ball-and-socket swivel joint. The knee 20 forms part of a support structure 22 situated in the cavity of body 10 and formed in one piece with the latter or inserted into and fixed to the body 10.

As shown in FIGS. 2 and 4, the rear view mirror assembly S is provided with an articulated support, generally indicated 24, which has a fixed part 26 and a rotatable part 28. The fixed part 26 has a mounting flange 30 with through holes 31 for fixing screws (not shown) by which the flange 30 can be fixed to the bodywork of the vehicle cab A. A bush 32 is formed integrally with the flange 30. The bush 32 provides a sealing for pivot pin 34 of the rotatable part 28. The hinge axis defined by the pivot pin 34 is disposed substantially vertically in the mounted position of the mirror S on the vehicle cab. The pivot pin 34 has a head 36 provided with radial teeth which are maintained in engagement with corresponding radial teeth on the bush 32 by a spring 38, in known manner, so as to maintain the mirror assembly in an engaged position in which the assembly projects laterally outwardly from the side of the vehicle, while permitting the mirror assembly to fold inwards against the body of the cab A in the event of a collision, as required by safety regulations. By selective engagement of the teeth of the head 36 and the bush 32 the angle of the reflective element 12 can be adjusted in a substantially horizontal plane.

The rotatable part 28 of the articulated support 24 has, in addition to the bolt 34 and the head 36, a bracket 40 provided with lower and upper articulation lugs 42, 44 (with reference to the mounted position of the assembly).

A similar bracket 46 is fixed to one side of the body 10 of the mirror. The bracket 46 which has a base flange 48 for connection to the body 10 and a pair of spaced apart lower and upper articulation lugs 50, 52. The pairs of articulation lugs 42, 44 and 50, 52 define respective pivot axes which, in the installed position of the mirror assembly S on a vehicle, are substantially horizontal.

the lower articulation lugs 42, 50 and the upper articulation lugs 44, 52 are interconnected pair by pair by an arm structure formed by a linkage generally indicated 54. The linkage 54 has a first link 56 of considerable length, one end of which is articulated to the lower lug 42 by means of a bolt 58 and the other end of which is articulated to the lower lug 50 by means of a bolt 60. The linkage 54 has a second link 62, slightly shorter than the first link 56, one end of which is articulated to the upper lug 44 by means of a bolt 64 and the other end of which is articulated by means of a bolt 66, to a short third link 68 which in turn is articulated to the upper lug 52 by means of a further bolt 70.

The length of the third link 68 between its two pivot axes defined by the bolts 70 and 66, is of the same order of magnitude as the distance between the axis of the bolts 60 and 70.

All the said bolts 58, 60, 64, 66 and 70 act as pivot pins and are provided with locking nuts (not referenced) and between the ends of the links and the corresponding lugs friction washers (not referenced) are interposed in a known manner.

With the mirror assembly S in its extended position for use, as shown in FIGS. 2 and 4 and indicated by solid lines in FIGS. 1, the first link 56 is substantially horizontal, whilst the second link 62 and the short third link 68 form between them a slightly obtuse angle with its vertex pointing downwards (FIG. 2). The linkage 54 may be maintained stably in this extended position by tightening at least one of its said articulation joints formed by the aforesaid bolts, which with their associated locking nuts form releasable locking means.

Adjustment of the height of the reflective element 12 and therefore of the body 10 is effected by slackening the said locking means and then grasping the body 10 with the hand and moving it upwards or downwards, as shown in FIGS. 1 and 2. Upon such adjustment the body 10 performs a rotation about the pivot pin 60. At the same time, the second and third links 62 and 68 rotate, the angle between these links increasing when the body 10 is rotated upwardly in the direction of the arrow F. The two links 56 and 62 also rotate slightly upwards around their fixed pivot pins 58 and 64. The body 10 of the mirror may be fixed at any desired height by the tightening of at least one of the bolts forming the pivot pins.

In order to retract the mirror body 10 completely within the dimensions of the projecting part of the vehicle body B, as shown in broken lines by 10a in FIG. 1, it is sufficient to continue the said upward rotation of the body in the direction of arrow F until the body 10 reaches the position shown in FIG. 5, in which the flange 48 is substantially horizontal and the linkage 54 is folded. It will be seen that the rotation of the two first and second links 56 and 62 about their pivot pins 58 and 64 is rather small (less than 10°), and the overall length of the linkage 54, in a transverse direction with respect to the pivot axes, has been little modified.

Since the articulation of the linkage 54 entails only a slight modification of its overall length the entire assembly of the articulated support 24, the linkage 54 and the bracket 46 can be enclosed in a tubular dust-proof bellows, generally indicated 72, of rubber or flexible plastics material. The limited dimensional variation of the linkage 54 between the extended configuration shown in FIG. 2 and the retracted configuration shown in FIG. 5 enables the expansion and contraction of the bellows 72 to be kept within permissible limits.

The flange 30 of the fixed part 26 of the articulated support 24 has a peripheral groove (not referenced), in which there is engaged resiliently an internal peripheral lip 74 formed at the corresponding end of the bellows 72. The other end of the bellows 72 has a similar internal peripheral lip 76 which is engaged resiliently in a similar external peripheral groove (not referenced) in the flange 48, thereby sealing the interior of the bellows 72.

When it is desired to tighten or slacken one of the bolts forming the pivot pins of the linkage 54 one of the ends of bellows 72 is removed from the respective flange 30 or 48 and the bellows 72 contracted until the bolt in question is visible. Given the elasticity of the bellows 72, this operation does not present any difficulty and may be carried out rapidly.

What is claimed is:

1. Rear view mirror for motor caravans, commercial vehicles and like vehicles, of the type comprising:
   a mirror body;
   a reflective element adjustably supported by said mirror body;
   an articulated support having a fixed part adapted to be fixed to a side of a vehicle body, and a rotatable part;
   an arm structure which interconnects said rotatable part of said support and a side of said mirror body to support said mirror body in a projecting manner with respect to said vehicle body, and
   pivot means by which said rotatable part of said support is pivoted, with respect to said fixed part, about an axis which, in a mounted position of said vehicle, is substantially vertical so as to enable an angular movement of said mirror body and said arm structure between a laterally extended position, projecting laterally outwardly with respect to said vehicle body, and a retracted position against said body,
   wherein the improvement lies in said arm structure comprising:
   a linkage having pivot axes which, in said mounted position on said vehicle, are substantially horizontal, said linkage forming a polygon which is capable of expansion at least between an extended position, in which said mirror body is at a maximum distance from said support, and a retracted position in which, said mirror body is raised and drawn near to said vehicle body, and releasable locking means on said linkage for selectively preventing and permitting said expansion of said linkage.

2. Rear-view mirror as defined in claim 1, wherein said linkage comprises:
   a first link, one end of which is pivoted to said rotatable part of said support and the other end of which is pivoted to said mirror body;
   a second link, one end of which is pivoted to said rotatable part of said support, and
   a third link, one end of which is pivoted to said mirror body and the other end of which is pivoted to the other end of said second link,
   whereby said linkage is arranged such that, in said extended position when mounted on said vehicle, the said pivot axes of said second link to said rotatable part of said support, and of said third link to said mirror body are situated above the said pivot axes of said first link, said first link being substantially horizontal and said second and third links forming between them an acute angle, the vertex of which points downwards.

3. Rear-view mirror as defined in claim 2, wherein a distance between the said axes by which said third link is pivoted to said mirror body and to said second link is substantially the same as a distance between the said axis by which said third link is pivoted to said mirror body and the said axis by which said first link is pivoted to said mirror body.

4. Rear-view mirror as defined in claims 1 or 2, wherein said releasable locking means comprise at least one bolt for the tightening of at least one said pivot of said linkage.

5. Rear-view mirror as defined in claim 2, wherein said rotatable part of said support has a first bracket provided with articulation lugs and said mirror body has a second bracket provided with articulation lugs, said links of said linkage being pivoted to said lugs.

6. Rear-view mirror as defined in claims 1 or 2, wherein said linkage and said support are enclosed within tubular dust-proof bellows the ends of which are engaged releasably with respective flanges on said support and said mirror body.

7. Rear-view mirror as defined in claim 6, wherein each of said flanges has an external peripheral groove which is resiliently engaged by an internal peripheral lip on a cooperating said end of said bellows.

8. Rear-view mirror as defined in claim 1, wherein said reflective element is adjustable within said mirror body by means of a ball-and-socket joint.

* * * * *